(No Model.)

S. T. ESKEW.
EVAPORATOR FOR SUGAR MAKING PURPOSES.

No. 362,068. Patented May 3, 1887.

Witnesses:
A. Ruppert,
R. E. Grant

Inventor:
S. T. Eskew,
Per
Thomas B. Simpson,
Atty.

UNITED STATES PATENT OFFICE.

SAMUEL THORNTON ESKEW, OF SUGAR VALLEY, GEORGIA.

EVAPORATOR FOR SUGAR-MAKING PURPOSES.

SPECIFICATION forming part of Letters Patent No. 362,068, dated May 3, 1887.

Application filed July 26, 1886. Serial No. 209,078. (No model.)

*To all whom it may concern:*

Be it known that I, SAMUEL THORNTON ESKEW, a citizen of the United States, residing at Sugar Valley, in the county of Gordon and State of Georgia, have invented certain new and useful Improvements in Evaporators; and I do declare the following to be a full, clear, and exact description of the invention, such as will enable other skilled in the art to which it appertains to make and use the same, reference being had to the accompanying drawings, and to the letters and figures of reference marked thereon, which form a part of this specification.

The invention will first be described in connection with the drawings, and then pointed out in the claims.

Figure 1:
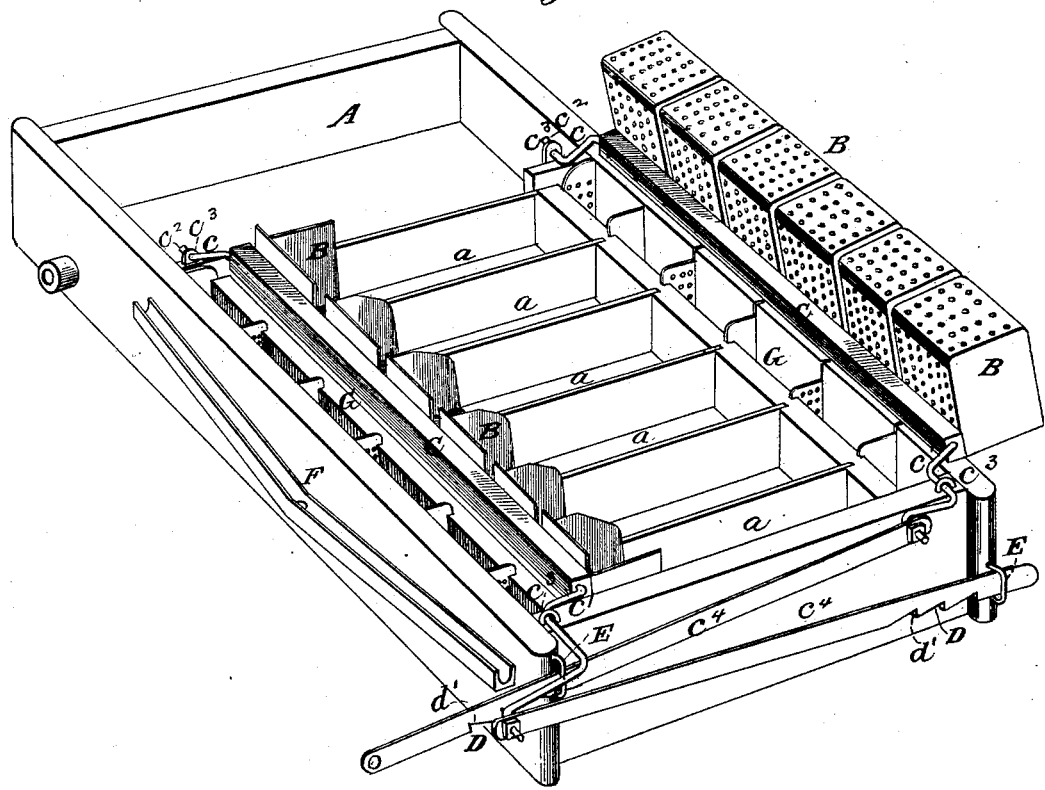
Figure 2:
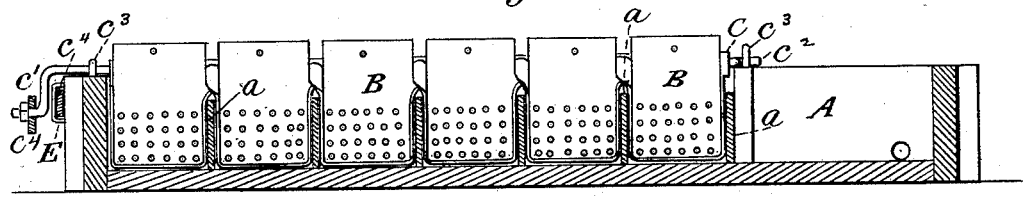
Figure 3:
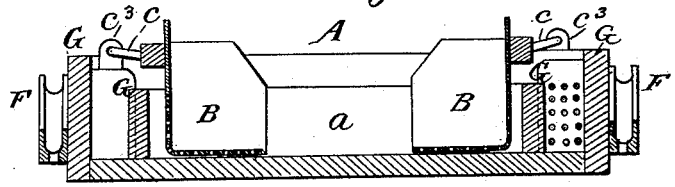

Figure 1 of the drawings is an elevation in perspective, and Fig. 2 a longitudinal vertical section. Fig. 3 is a cross-section.

In the drawings, A represents an evaporator for sirup-making purposes, the same being subdivided into transverse rectangular compartments $a$. Into each of these I fit in the opposite ends a strainer or skimmer, B, having a reticulated back and bottom. I thus form in the evaporator two opposite rows of strainers, each row being all upon a single bar, C, cranked at $c\ c\ c'$, and provided with the journals $c^2\ c^2$, which turn in bearings $c^3\ c^3$. By operating handles $c^4\ c^4$ the rows of strainers may be raised, so as to strain the liquid or juice back into the evaporator, while the scum and feculent matter are retained in the strainers.

In order to hold each row of skimmers at the proper angle for straining, I attach to each handle $c^4$ a pivoted bar or plate, D, which is provided with several notches under and near the front end. The latter is supported opposite to the pivoted end by a wire keeper, E, against which bear the shoulders $d'$, so as to hold the strainers while performing their function. As soon as the straining is completed the crank-shaft is turned still farther back to bring the open end of the bottom over the trough F, which is made to incline from each end to the middle, where is made a vertical hole, through which the skimmings are discharged into any suitable receptacle.

The strainers will be raised more or less and correspondingly held by a shoulder, $d'$, according to the height of the juice in the evaporator.

When double gunwales G G are employed, I usually make the strainers with a spoon-shaped bottom, so that the operator may take out the strainer and remove the trash therefrom. On the other hand, if a single gunwale is employed, the strainers are fastened to the bar C, and the latter provided with a very small crank, so as just to rest on top of the gunwale.

I am aware that it is not broadly new to use a hinged strainer, one being shown and described in the old expired Patent No. 57,459; but What I do claim as new, and desire to protect by Letters Patent, is—

1. An evaporator subdivided transversely into separate compartments and each fitted at its opposite ends with a rectangular strainer, said strainers being arranged in two opposite rows upon pivoted crank-bars, as and for the purpose specified.

2. The evaporating-pan A and strainer-bar C, cranked, journaled, and provided with handles $c^4$, in combination with the notched bars D, pivoted to said handles and working in wire keepers E, whereby the strainers may be held at different angles, as and for the purpose set forth.

In testimony whereof I affix my signature in presence of two witnesses.

SAMUEL THORNTON ESKEW.

Witnesses:
JOHN A. JERVIS,
YOUNG J. MALONE.